United States Patent
Shi

(10) Patent No.: US 7,778,332 B2
(45) Date of Patent: Aug. 17, 2010

(54) METHOD AND DEVICE FOR CROSSTALK TEST IN MULTI-SUBSCRIBER COMMUNICATION LINE

(75) Inventor: Qingquan Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 809 days.

(21) Appl. No.: 11/604,619

(22) Filed: Nov. 27, 2006

(65) Prior Publication Data
US 2007/0121715 A1    May 31, 2007

(30) Foreign Application Priority Data
Nov. 30, 2005    (CN) .................. 2005 1 0126119

(51) Int. Cl.
H04B 3/00 (2006.01)
H04L 25/00 (2006.01)
(52) U.S. Cl. .................. 375/257; 375/224; 370/201; 439/941; 324/628; 379/22.02
(58) Field of Classification Search .................. 375/224, 375/257; 370/201; 439/941; 324/628; 379/22.02
See application file for complete search history.

(56) References Cited

U.S. PATENT DOCUMENTS

| 6,198,292 | B1 | 3/2001 | Kirk et al. | |
| 7,142,501 | B1 * | 11/2006 | Barrass et al. | 370/201 |
| 7,275,193 | B1 * | 9/2007 | Verma | 714/725 |
| 2002/0041565 | A1 * | 4/2002 | Valenti et al. | 370/201 |

FOREIGN PATENT DOCUMENTS

| WO | 02/058315 | 7/2002 |
| WO | 02/063813 | 8/2002 |

\* cited by examiner

Primary Examiner—Mohammad H Ghayour
Assistant Examiner—Sung Ahn
(74) Attorney, Agent, or Firm—Brinks Hofer Gilson & Lione

(57) ABSTRACT

Embodiments of the present invention provide a method and a device for crosstalk test in multi-subscriber communication line. The core of embodiments includes: first, transmitting a test signal in a selected line; then, receiving the signal in the line to be tested, and calculating the received signal according to the transmitted test signal; thus, determining whether there is crosstalk between the line to be tested and the selected line according to the calculation result, as well as the value of the crosstalk if the crosstalk exists.

5 Claims, 5 Drawing Sheets

Samples of the signal sequence

METHOD AND DEVICE FOR CROSSTALK TEST IN MULTI-SUBSCRIBER COMMUNICATION LINE

This application claims priority to Chinese Patent Application No. 200510126119.4, filed Nov. 30, 2005, which is hereby incorporated by reference in its entirety.

FIELD OF THE INVENTION

The present invention relates to the technical field of network communication, and particularly to the technical field of crosstalk test in multi-subscriber communication line.

BACKGROUND OF THE INVENTION

With the development of ADSL (Asymmetrical Digital Subscriber Line) technology, the related technologies keep being renewed, and evolve from the first generation ADSL to the second generation ADSL2, ADSL2+ and the even newer VDSL2, in the meanwhile, the frequency bands used in various technologies increase gradually, and the corresponding bandwidths also increase gradually. When the frequency spectrum below 1.1 MHz is used in the downstream of ADSL and ADSL2, a maximum downstream rate of 8 Mbps can be provided, and the downstream bandwidth is extended to 2.2 MHz in ADSL2+, with which a maximum downstream rate of 24 Mbps can be provided, and even frequency spectrum up to 30 MHz can be used by the downstream bandwidth of VDSL2, which can provide a symmetric upstream and downstream rates up to 100 Mbps.

However, with the increase of the frequency band used in xDSL technology, crosstalk, especially the crosstalk in the high-frequency range becomes more significant. The crosstalk includes NEXT (Near-End Crosstalk) and FEXT (Far-End Crosstalk), as shown in FIG. 1 and FIG. 2, wherein the NEXT does not have much impact on the performance of the system, however, the FEXT can seriously affect the transmission performance of the line.

For example, when multiple subscribers apply for subscribing to the xDSL service in a bundle of cables, the transmission rate of some lines may be lowered, the transmission performance is unstable, or even the xDSL service can not be provided due to the FEXT, as a result, the line activation rate of DSLAM (Digital Subscriber Line Access Multiplexer) will be definitely and relatively low.

With regard to the crosstalk, at present, in simple cases, some providers have established their own criterions for the application and management of the frequency spectrum to avoid mutual disturbance of the crosstalk among the devices at various locations.

In order to improve the crosstalk issue among multiple subscribers effectively, firstly, a quantitative measurement of the crosstalk existing among multiple subscribers should be executed, after that, the corresponding measures for restraining the crosstalk can be taken according to the obtained amount of crosstalk. However, currently the quantitative test is not available for the crosstalk among multiple lines. Therefore, at present, the performance of a DSL line or system can be optimized only according to some statistical characteristics of the crosstalk, in such case, the corresponding optimization degree of the DSL line is apparently unsatisfactory.

SUMMARY OF THE INVENTION

An embodiment of the present invention provides a method for the crosstalk test in multi-subscriber communication line, including:

A. transmitting a test signal in a selected line;
B. receiving the signal in the line to be tested, and calculating the received signal according to the transmitted test signal;
C. determining according to the calculation result whether there is crosstalk between the line to be tested and the selected line, and the value of the crosstalk if the crosstalk exists.

An embodiment of the present invention also provides a device for the crosstalk test in a multi-subscriber communication line, including:

test signal receiving module, which receives the crosstalk signal generated by a test signal transmitted in a selected line in the line to be tested, and forwards the received signal to received signal processing module;

received signal processing module, which performs a cross correlation calculation of the received signal and the transmitted test signal, and outputs the calculation result to crosstalk test processing module crosstalk test processing module, which calculates and determines whether there is crosstalk according to the calculation result, and determines the corresponding value of the crosstalk if the crosstalk exists.

As can be seen from the solution according to the embodiments of the present invention, the average magnitude of the crosstalk between two lines can be accurately measured, thus a corresponding original basis is provided for the processing of decreasing the crosstalk such as DSM (Dynamic frequency Spectrum Management), etc., so as to adopt reasonable technical means for decreasing the crosstalk to decrease the crosstalk between DSL lines, to ensure good transmission performance of the DSL line, and to increase the subscription rate of DSL service.

DETAILED DESCRIPTION OF THE EMBODIMENTS

The core of the embodiments in present invention is to provide a solution for rapidly detecting wire pairs in which there is crosstalk in the same cable. According to the present invention, average magnitude of the crosstalk between two DSL lines can be measured, thus original data can be provided for the technology of decreasing crosstalk, such as DSM, etc.

The embodiments will be described in detail with reference to the accompanying drawings.

Figure 1:
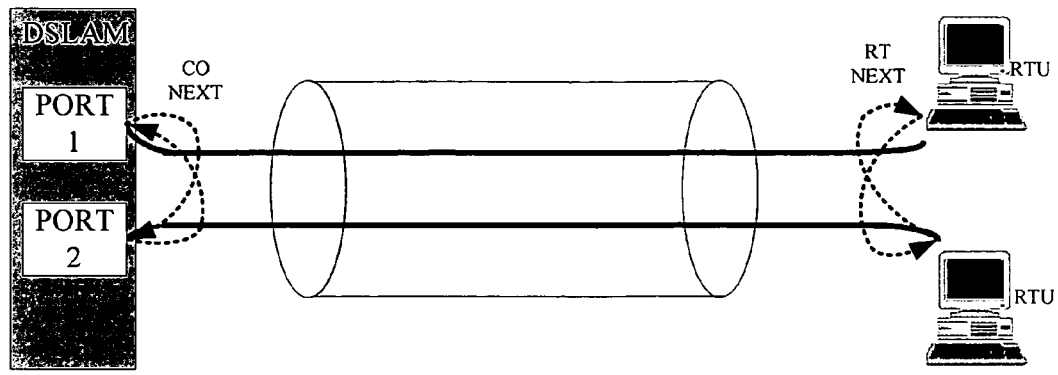
FIG. 1 is a schematic diagram of NEXT in DSL line.
Figure 2:
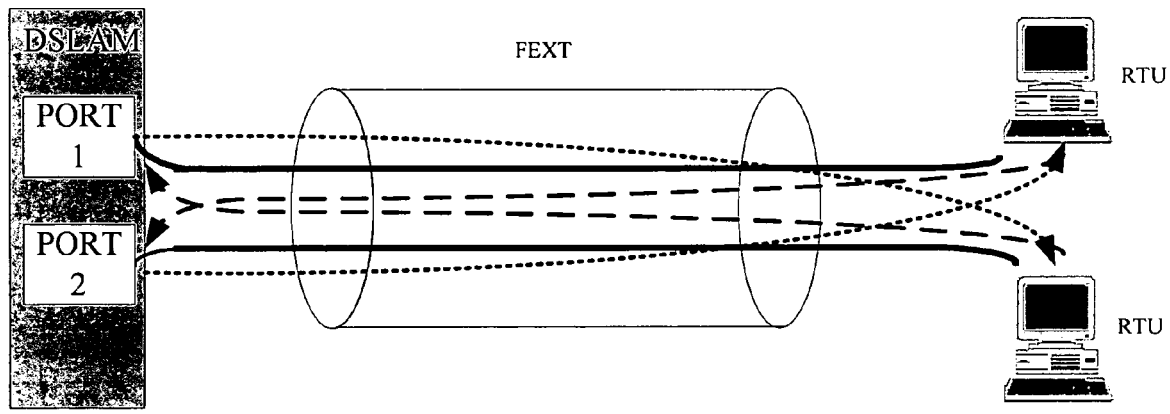
FIG. 2 is a schematic diagram of FEXT in DSL line.
Figure 3:
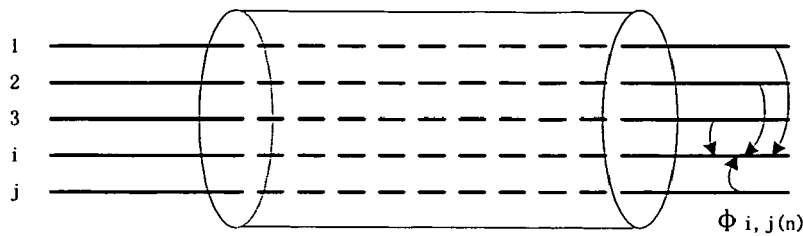
FIG. 3 is a schematic diagram of a crosstalk model of the transmission in multiple DSL lines.

The functions and variables involved in the description are defined. As shown in FIG. 3, $\phi_{i,j}$ represents the crosstalk generated by the line numbered j with respect to line numbered i, then the total crosstalk energy affecting the line i is $$\sum_{j=1}^{M} \phi_{i,j},$$

wherein, $\phi_{i,j}=0$ (i=j), M is the number of the lines.

In general, the total crosstalk energy of one line can be measured coarsely during the silent-period of the line. Line performance can be evaluated with the data of total crosstalk energy obtained by the measurement, but it cannot be used for the optimization of the entire line.

In order to realize the optimization for the entire line, the crosstalk between every two lines in the entire system should be obtained, i.e., $\phi_{i,j}$ of each line in the entire system, wherein i=1 ... M, j=1 ... M. Quantitative measurement for the crosstalk between every two lines can be implemented with the method according to the embodiment.

In the same period, all the other lines in the entire system may generate interference to a certain line. As shown in FIG. 3, the line 1, 2, 3 and j all generate the crosstalk with regard to the line i. Then it's necessary to obtain the crosstalk generated by the line 1, 2, 3 and j respectively with regard to the line i in the same period.

In the embodiment, signal that has a relatively strong self-correlation is used as the test signal, such as the chirp signal. Thus, the total crosstalk signal can be decomposed into the sum of the crosstalk of each line.

Figure 4:
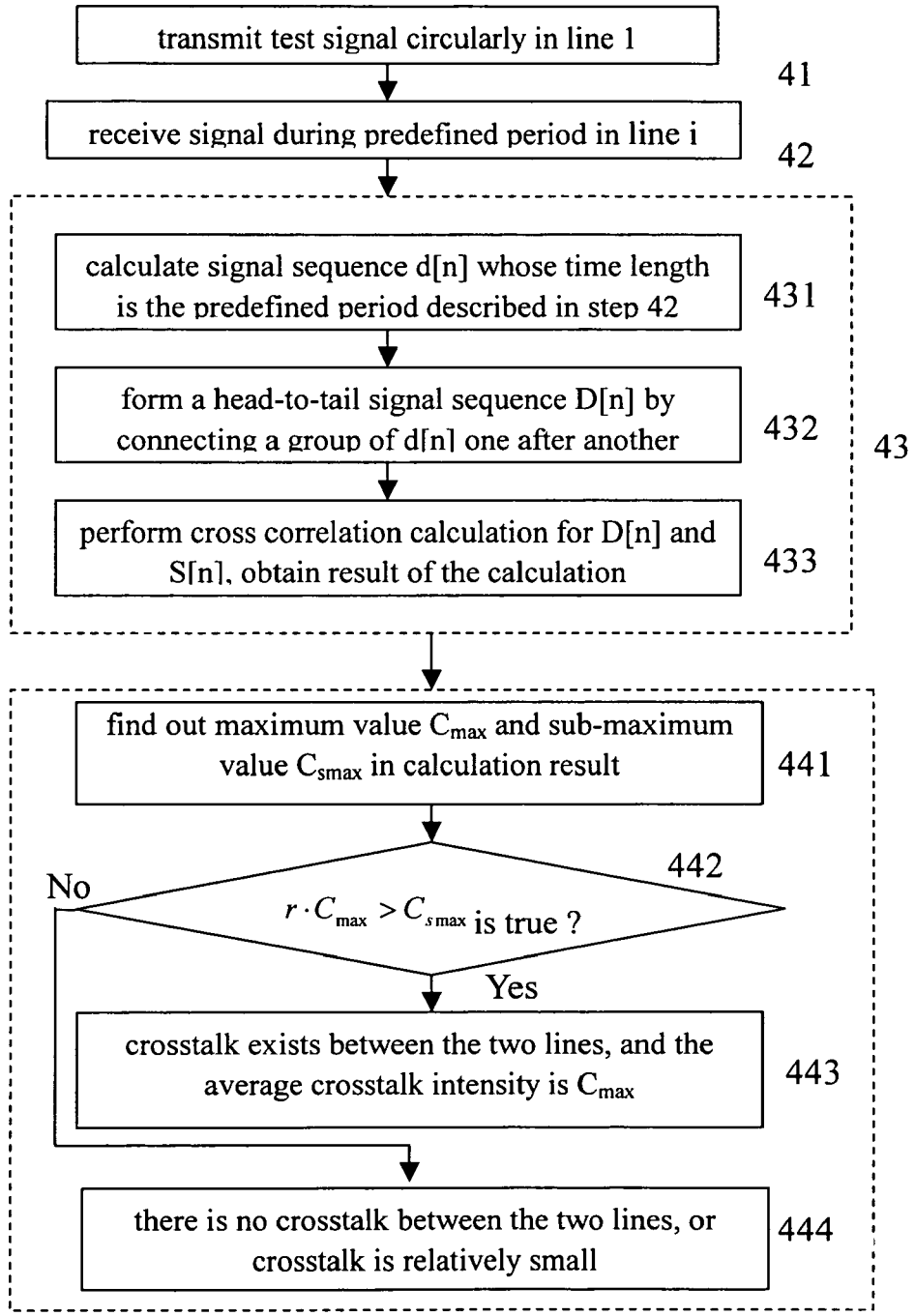
FIG. 4 is a schematic diagram of the detailed implementation of the method according to an embodiment of the present invention.
Figure 5:
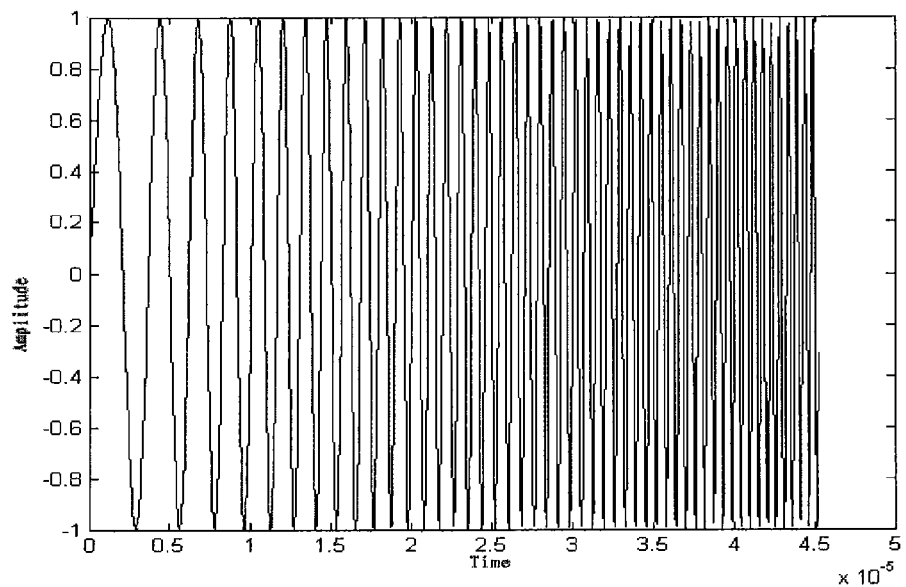
FIG. 5 is a schematic diagram of the transmitted signal for test used in an embodiment of the present invention.

For example, for measuring the crosstalk in the line i affected by the line 1 in the application scenario shown in FIG. 3, the corresponding procedure is shown in FIG. 4, which includes the following steps:

Step 41: transmit a test signal circularly in the line 1;

A chirp signal of certain time length with relatively strong self-correlation can be used as the transmitted test signal, i.e., the corresponding chirp signal is transmitted circularly in a predefined continuous period, the chirp signal is shown in FIG. 5, the expression of the signal is:

$$x(t) = \sin\left(2\pi\left(f_l + \frac{f_h}{T} \cdot t\right) \cdot t\right) \quad (1)$$

wherein, $f_l$ is the lowest frequency of the signal, $f_h$ is the highest frequency of the signal, and T is the duration of the signal, which is called the first predefined period.

The circular transmitting means that after the transmission of the signal shown in FIG. 3, it is immediately transmitted repeatedly until the continuous transmission period T elapses;

In this step, other signals with self-correlation conforming with the predefined requirements can also be adopted as the test signal transmitted in the line 1, such as a pseudo-random sequence, etc.

Figure 6:
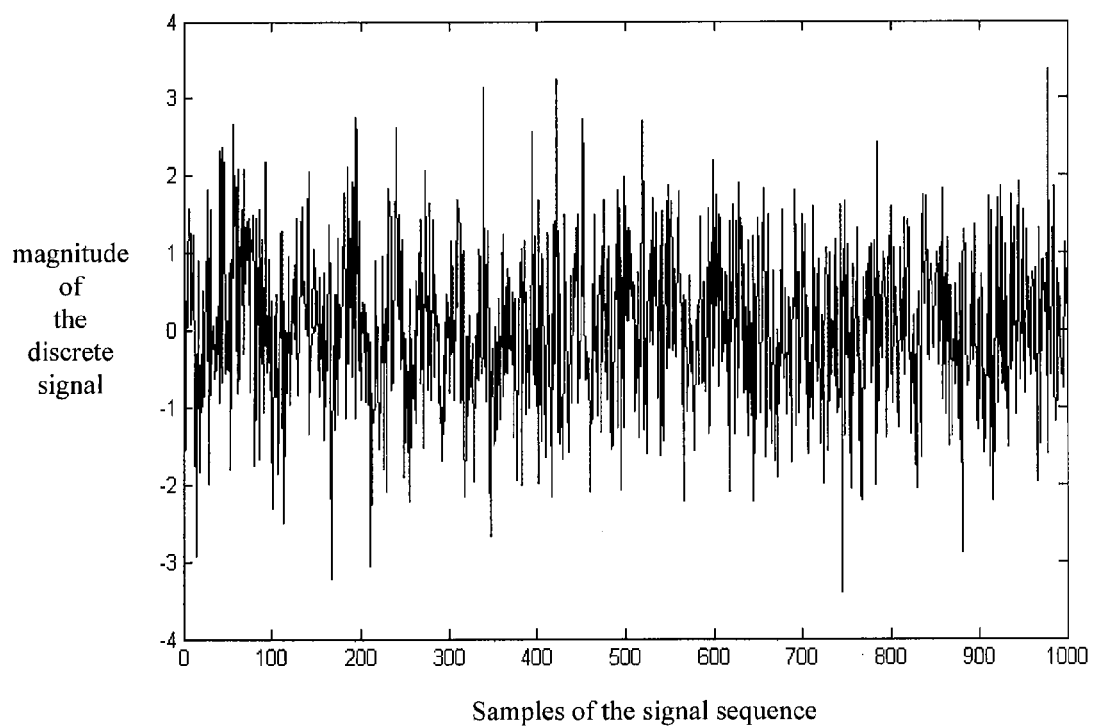
FIG. 6 is a schematic diagram of the sampling signal of DSL line i.
Figure 7:
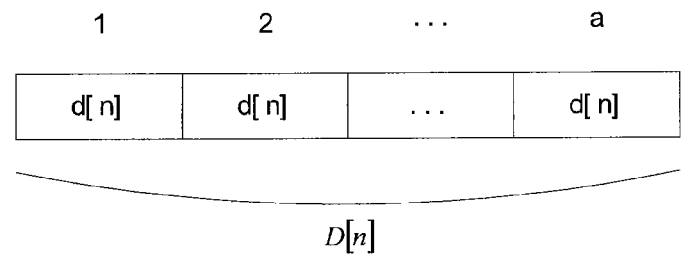
FIG. 7 is a schematic diagram of signal sequence D[n]

Step 42: when the test signal is being transmitted, after a certain period of stabilization τ, receive the signal in the line i, and stop transmission of the test signal in the line 1 as soon as the signal-receiving of the predefined period is over;

In detail: when the test signal starts to be transmitted in step 1, after a certain period τ (τ=1 ms), sample and receive signal sequence S[n] whose time length is $t_{sample}$ with sampling frequency $F_s$ in the line i, wherein $t_{sample} \geq T$ is required. At this time, the number of samples of signal sequence S[n] is $F_s \times t_{sample}$, wherein, $t_{sample}$ is called the second predefined period;

The signal sampled and received in this step is shown in FIG. 6, wherein the horizontal axis represents the samples of the signal sequence, and the vertical axis represents the magnitude of the discrete signal. The signal x(t) via line coupling and the noise signal of the line itself are contained in FIG. 6.

Step 43: process the signal sequence received in the line i, i.e., perform the cross correlation calculation of the received signal sequence and the test signal sequence transmitted in the line 1, and obtain the result of the calculation;

This step includes the following steps in detail:

Step 431: using formula (1), calculate a signal sequence d[n] whose time length is T with sampling frequency of Fs, the number of samples is $F_s \times T$, detailed way of calculation is:

$$d[n] = \sin\left(2\pi\left(f_l + \frac{f_h}{T} \cdot \frac{k}{F_s}\right) \cdot \frac{k}{F_s}\right), k = 0, 1, \ldots, F_s T - 1;$$

Step 432: form a head-to-tail signal sequence D[n] by connecting a groups of d[n] one after another;

wherein, $$a = \begin{cases} \left\lceil \frac{t_{sample}}{T} \right\rceil & \frac{t_{sample}}{T} \text{ is not integer} \\ \left\lceil \frac{t_{sample}}{T} \right\rceil + 1 & \frac{t_{sample}}{T} \text{ is integer} \end{cases}$$

Step 433: perform the cross correlation calculation of D[n] and S[n], the result is $$C[n] = \sum_{k=0}^{F_s T} D(n+k)S(k), n = 0 \cdots aF_s T - F_s t_{sample} - 1.$$

Figure 8:
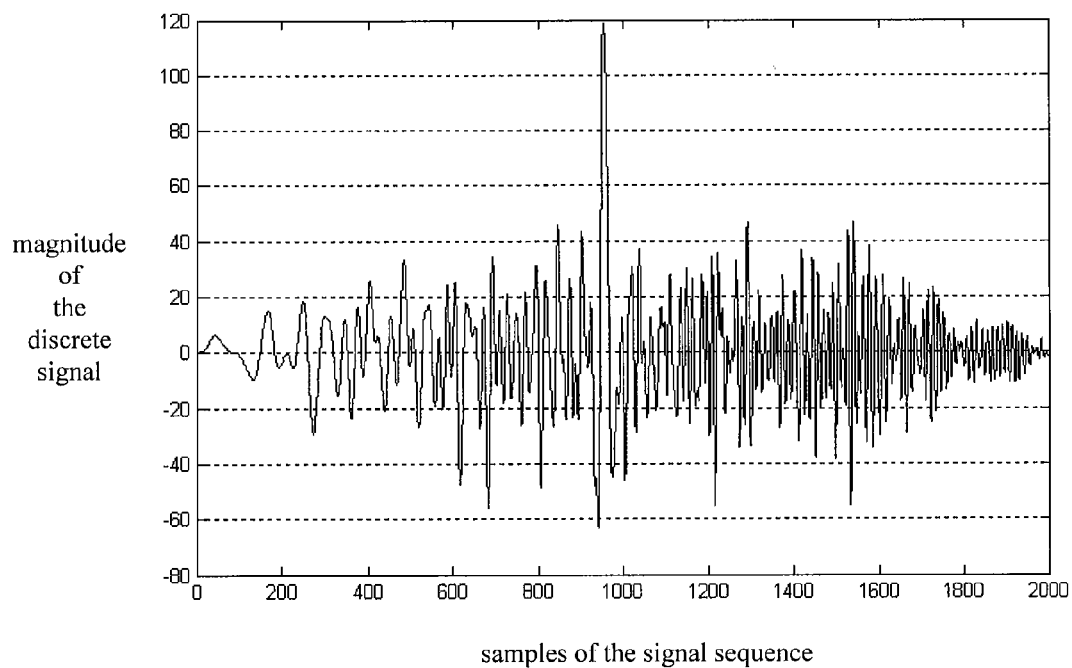
FIG. 8 is a first schematic diagram of the obtained C[n] based on the calculation of D[n]
Figure 9:
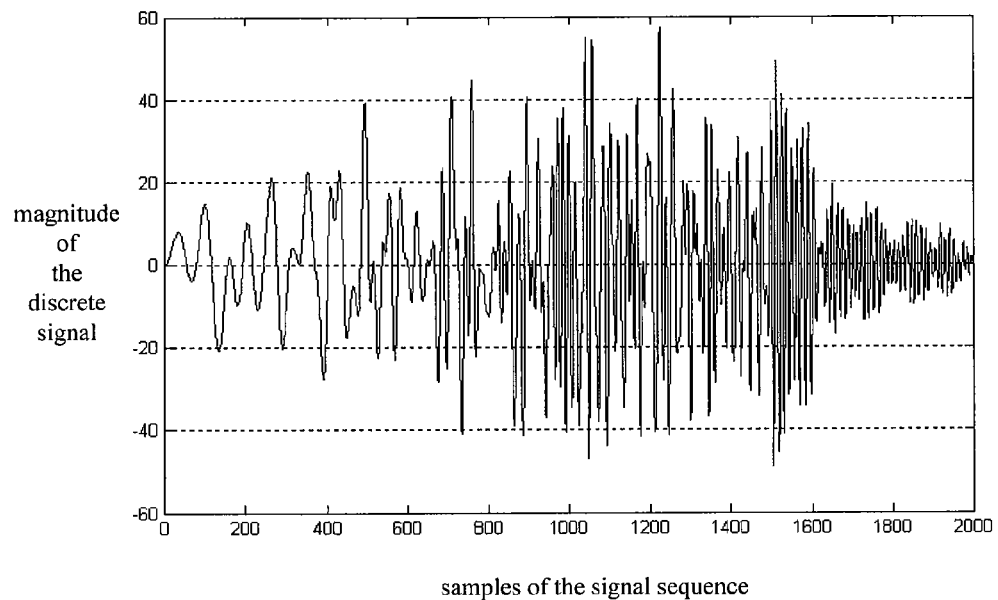
FIG. 9 is a second schematic diagram of the obtained C[n] based on the calculation of D[n]

Step 44: determine whether there is crosstalk in the line i caused by the line 1 based on the result of the cross correlation calculation, and further determine the quantitative value of the specific crosstalk if the crosstalk exists;

The result of the cross correlation calculation obtained in step 43 can be the situation as shown in FIG. 8, or can also be the situation as shown in FIG. 9, wherein the horizontal axis represents the samples of the signal sequence, and the vertical axis represents the magnitude of the discrete signal.

The calculation result C[n] shown in FIG. 8 shows that the crosstalk exists between the line i and the line 1, whereas the calculation result C[n] shown in FIG. 9 shows that there is no crosstalk between the line i and line 1;

The implementation of step 44 includes following steps:

Step 441: find out the maximum value $C_{max}$ and the sub-maximum value $C_{smax}$ according to magnitude in |C[n]| sequence (|·| means absolute value operation);

Step 442: determine whether the relationship between the maximum value $C_{max}$ and the sub-maximum value $C_{smax}$ is $r \cdot C_{max} > C_{smax}$, wherein, r=0.7, r can also be a decimal greater than 0 and less than 1, if $r \cdot C_{max} > C_{smax}$, then go to step 443, or else go to step 444;

Step 443: determine there is crosstalk between the line i and the line 1, and the average crosstalk intensity is $C_{max}$.

Step 444: determine there is no crosstalk between the line i and the line 1, or the crosstalk is too small to affect the line i.

So far, in the embodiments provided by the present invention, the accurate quantitative measurement of the crosstalk between every two lines is realized.

As shown in FIG. 3, besides the line i, for any one of the rest lines the average crosstalk intensity between each line and the line i can be obtained by performing the steps 41 to 44 repeatedly, thus, the calculating of the crosstalk for each line will not be described in detail again.

Figure 10:
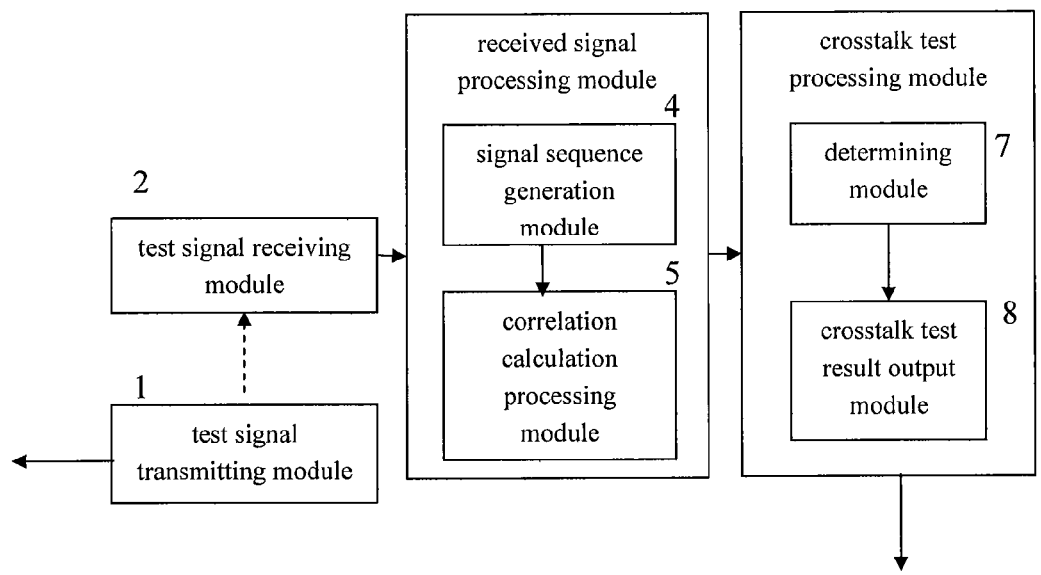
FIG. 10 is a schematic diagram of the structure of the detailed implementation of the device according to an embodiment of the present invention.

An embodiment of the present invention also provides a device for the crosstalk test in multi-subscriber communication line, the structure of the implementation of the device is shown in FIG. 10, which includes the following function modules:

(1) Test Signal Transmitting Module 1

It transmits a signal of predefined time length with the correlation conforming with the predefined requirements as the test signal in a selected line. For example, a chirp signal of a first predefined continuous period, etc. can be transmitted. The transmission of the test signal may cause that the test signal receiving module 2 in the line to be tested can receive the crosstalk signal generated by the test signal.

(2) Test Signal Receiving Module 2

It receives in the line to be tested the crosstalk signal generated by the test signal transmitted in the selected line, and forwards the received signal to a received signal processing module 3.

(3) Received Signal Processing Module 3

It performs the cross correlation calculation of the received signal and the transmitted test signal, and outputs the calculation result to a crosstalk test processing module 6.

The received signal processing module 3 further includes:

signal sequence generation module 4, which generates a head-to-tail signal sequence based on the transmitted signal sequence and the ratio of the duration length of receiving signal to the duration length of transmitting test signal, the method for obtaining the head-to-tail signal sequence has been described above, and will not be detailed again;

correlation calculation processing module 5, which performs the cross correlation calculation of the head-to-tail signal sequence generated by the signal sequence generation module 4 and the received signal, and outputs the calculation result to a crosstalk test processing module 6.

(4) Crosstalk Test Processing Module 6

It calculates and determines whether there is crosstalk according to the calculation result, and determines the corresponding value of the crosstalk if the crosstalk exists, the detail is: according to whether the maximum value is apparently greater than the sub-maximum value in the result of the correlation calculation;

The crosstalk test processing module 6 includes:

determining module 7, which determines whether there is crosstalk according to the relative magnitude between the maximum value and the sub-maximum value in the calculation result, and notifies the determination result to an crosstalk test result output module 8;

crosstalk test result output module 8, which outputs the maximum value as the value of the crosstalk when it is determined that the crosstalk exists; or outputs the result that there is no crosstalk when the crosstalk doesn't exist.

As described above, there is provided a method for the crosstalk test in multi-subscriber communication line, including;

A. transmitting a test signal in a selected line;

B. receiving the signal in a line to be tested, and calculating the received signal according to the transmitted test signal;

C. determining according to the calculation result whether there is crosstalk between the line to be tested and the selected line, and the value of the crosstalk if the crosstalk exists.

The step A includes:

transmitting a test signal circularly via a selected line during a first predefined continuous time period.

The test signal is a signal whose self-correlation conforms with predefined requirements.

The step B includes:

receiving the signal in the line to be tested, and performing a cross correlation calculation of the received signal and the test signal transmitted in the selected line, so as to obtain the calculation result.

The step B includes:

when the test signal is transmitted in the selected line and after a predefined period of stabilization, receiving the signal during a second predefined continuous period in the line to be tested.

The step B includes:

B1. calculating the signal sequence of the transmitted test signal within the first predefined period according to the transmitted test signal;

B2. processing the signal according to the ratio of the first predefined period to the second predefined period, obtaining a corresponding head-to-tail signal sequence;

B3. performing the cross correlation calculation between the obtained head-to-tail signal sequence and the signal received in the second predefined period, and obtaining the calculation result.

The step B2 includes:

calculating the value of an adjustment parameter, which is the ratio of the first predefined period to the second predefined period, and the value of the adjustment parameter is the ratio plus 1 if the ratio is an integer;

forming a head-to-tail signal sequence by connecting the signal sequences within the first predefined period one after another, wherein the number of the signal sequences equals the value of the adjustment parameter.

The step C includes:

obtaining the maximum value and the sub-maximum value from the absolute values of the obtained correlation calculation result;

determining whether there is crosstalk according to the relative magnitude between the maximum value and the sub-maximum value, and determining that the value of the crosstalk intensity is the maximum value if the crosstalk exists.

There is also provided a device for the crosstalk test in a multi-subscriber communication line, including:

test signal receiving module 2, which receives the crosstalk signal generated by a test signal transmitted in a selected line in the line to be tested, and forwards the received signal to received signal processing module 3;

received signal processing module 3, which performs a cross correlation calculation of the received signal and the transmitted test signal, and outputs the calculation result to crosstalk test processing module 6;

crosstalk test processing module 6, which calculates and determines whether there is crosstalk according to the calculation result, and determines the corresponding value of the crosstalk if the crosstalk exists.

The device further includes:

test signal transmitting module 1, which transmits a signal of a predefined time length with correlation conforming with the predefined requirements as the test signal in the selected line.

The received signal processing module 3 includes:

signal sequence generation module 4, which generates a head-to-tail signal sequence based on the transmitted signal sequence and the ratio of the duration length of receiving signal to that of transmitting test signal;

correlation calculation processing module 5, which performs the cross correlation calculation of the head-to-tail signal sequence generated by the signal sequence generation module 4 and the received signal, and outputs the calculation result to the crosstalk test processing module 6.

The crosstalk test processing module 6 includes:

determining module 7, which determines whether there is crosstalk according to the relative magnitude between the maximum value and the sub-maximum value in the calculation result, and notifies the determination result to crosstalk test result output module 8;

crosstalk test result output module 8, which outputs the maximum value as the value of the crosstalk when it is determined that the crosstalk exists; or outputs the result that no crosstalk exists when determined that there is no crosstalk.

As described above, in the present invention, the average magnitude of the crosstalk between two lines can be accurately measured, thus the original data can be provided for the technologies of decreasing crosstalk, such as DSM, etc., so as to decrease the crosstalk between DSL lines with reasonable technical means for decreasing the crosstalk, ensure the good transmission performance of DSL line, and increase the subscription rate of the DSL service.

The above mentioned are only preferred embodiments and are not limiting the present invention. Those skilled in the art should recognize that various variations and modifications can be made without departing from the spirit and scope of the present invention, as defined by the accompanying claims.

The invention claimed is:

1. A method for performing a crosstalk test in a multi-subscriber communication line, comprising:

transmitting a test signal in a selected line during a first predefined continuous period;

receiving a crosstalk signal generated by the test signal in a line to be tested, during a second predefined continuous period;

calculating a signal sequence of the transmitted signal within the first predefined continuous period according to the test signal;

calculating a signal sequence of the received crosstalk signal within the second predefined continuous period according to the received crosstalk signal;

processing the signal sequence of the transmitted signal and the ratio of the first predefined continuous period to the second predefined continuous to obtain a corresponding head-to-tail signal sequence;

performing a cross correlation calculation between the obtained head-to-tail signal sequence and the signal sequence of the received crosstalk signal within the second predefined continuous period to obtain a calculation result;

determining whether there is crosstalk between the line to be tested and the selected line according to the calculation result; and determining the value of any existing crosstalk.

2. The method according to claim 1, wherein, said step of processing the received crosstalk signal according to the signal sequence of the received crosstalk signal and the ratio of the first predefined continuous period to the second predefined continuous to obtain a corresponding head-to-tail signal sequence comprises:

calculating the value of an adjustment parameter, which is the ratio of the first predefined period to the second predefined period, and the value of the adjustment parameter is the ratio plus 1 if the ratio is an integer; and forming the head-to-tail signal sequence by connecting the signal sequences within the first predefined period one after another, wherein the number of the signal sequences equals to the value of the adjustment parameter.

3. The method according to claim 1, wherein, said step of determining whether there is crosstalk between the line to be tested and the selected line according to the calculation result, and determining the value of any existing crosstalk comprises:

obtaining a maximum value and a second maximum value from all absolute values of the obtained the calculation result;

determining whether there is crosstalk according to a relative magnitude between the maximum value and the second maximum value, and determining that the value of the crosstalk intensity is the maximum value when the crosstalk exists.

4. A device for performing a crosstalk test in a multi-subscriber communication line, comprising:

a test signal transmitting module configured to transmit a test signal of a predefined time length in a selected line with correlation conforming with the predefined requirements as the test signal in the selected line;

a test signal receiving module configured to receive a crosstalk signal generated by the test signal in a line to be tested, and to forward the received crosstalk signal to a received signal processing module;

the received signal processing module comprising:

a signal sequence generation module configured to generate a head-to-tail signal sequence based on a signal sequence of the test signal and the ratio of the duration length of the received crosstalk signal to the duration of length of the test signal, a correlation calculation processing module configured to process the cross correlation calculation of the head-to-tail received signal sequence generated by the signal sequence generation module and the received crosstalk signal, and output a calculation result to a crosstalk test processing module; and the crosstalk test processing module configured to determine whether there is crosstalk according to the calculation result, and to determine a corresponding value of any existing crosstalk.

5. The device according to claim 4, wherein the crosstalk test processing module comprises:

a determining module configured to determine whether there is crosstalk according to the relative magnitude between a maximum value and a second maximum value in the calculation result, and to notify a crosstalk test result output module whether there exits crosstalk;

wherein the crosstalk test result output module is configured to output the maximum value as the value of the crosstalk when it is determined that the crosstalk exists; or to output a result that no crosstalk exists when the determining module determines that there is no crosstalk.

* * * * *